US012528506B2

(12) United States Patent
Ward et al.

(10) Patent No.: US 12,528,506 B2
(45) Date of Patent: Jan. 20, 2026

(54) TELEOPERATION OF A VEHICLE

(71) Applicant: Zoox, Inc., Foster City, CA (US)

(72) Inventors: Erik Carl Ward, San Francisco, CA (US); Ravi Gogna, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 169 days.

(21) Appl. No.: 18/339,754

(22) Filed: Jun. 22, 2023

(65) Prior Publication Data

US 2024/0425079 A1    Dec. 26, 2024

(51) Int. Cl.
*B60W 60/00*    (2020.01)

(52) U.S. Cl.
CPC ..... *B60W 60/0015* (2020.02); *B60W 2510/20* (2013.01); *B60W 2540/215* (2020.02); *B60W 2554/20* (2020.02); *B60W 2554/40* (2020.02); *B60W 2556/45* (2020.02)

(58) Field of Classification Search
CPC ......... B60W 60/0015; B60W 2510/20; B60W 2540/215; B60W 2554/20; B60W 2554/40; B60W 2556/45
See application file for complete search history.

(56) References Cited

U.S. PATENT DOCUMENTS

| | | | |
|---|---|---|---|
| 11,409,278 B2 | 8/2022 | Gogna et al. | |
| 11,853,068 B1* | 12/2023 | Agarwal | G05D 1/0088 |
| 11,858,536 B1* | 1/2024 | Liu | G06N 3/0464 |
| 12,124,263 B2* | 10/2024 | Dupre | G01C 21/3658 |
| 2017/0192423 A1* | 7/2017 | Rust | G05D 1/0212 |
| 2018/0224850 A1* | 8/2018 | Kroop | G08G 1/00 |
| 2018/0267537 A1* | 9/2018 | Kroop | B60W 30/10 |
| 2018/0284785 A1* | 10/2018 | Berntorp | G08G 1/166 |
| 2019/0286151 A1* | 9/2019 | Palanisamy | G08G 1/096816 |
| 2020/0309923 A1 | 10/2020 | Bhaskaran et al. | |
| 2021/0323573 A1* | 10/2021 | Gogna | G01C 21/3407 |
| 2022/0081001 A1* | 3/2022 | Xia | B60W 60/0016 |
| 2022/0194419 A1* | 6/2022 | Houshmand | B60W 60/0023 |
| 2022/0266871 A1* | 8/2022 | Hayashi | B60W 40/04 |
| 2023/0032713 A1* | 2/2023 | Kothbauer | G05D 1/0011 |
| 2023/0060435 A1* | 3/2023 | Funke | G05D 1/225 |
| 2023/0159059 A1* | 5/2023 | Garimella | G05D 1/246 |
| | | | 701/26 |

(Continued)

FOREIGN PATENT DOCUMENTS

WO    WO-2018172849 A1 *    9/2018    ........ B60W 60/0011

OTHER PUBLICATIONS

International Search Report and Written Opinion dated Sep. 20, 2024 for International PCT Application No. PCT/US2024/032441.

*Primary Examiner* — Kito R Robinson
*Assistant Examiner* — Tanya C Sienko
(74) *Attorney, Agent, or Firm* — EIP US LLP

(57) ABSTRACT

According to an aspect of the disclosure, a method is provided comprising receiving sensor data from a sensor of a vehicle, such as an autonomous vehicle, and determining, based at least in part on the sensor data, a subset of motion options from a predetermined set of motions options associated with controlling the vehicle. A representation of the subset of motion options is transmitted to a remote system. A first motion option of the subset of motion options is received from the remote system, and the vehicle is controlled based at least in part on the first motion option.

20 Claims, 9 Drawing Sheets

(56) References Cited

U.S. PATENT DOCUMENTS

| | | | | |
|---|---|---|---|---|
| 2023/0176573 A1* | 6/2023 | Kumavat | ............. | G05D 1/0038 701/23 |
| 2023/0192129 A1* | 6/2023 | Winter | ................. | G05D 1/2249 701/24 |

* cited by examiner

500

A

Receive second motion option 512

Control vehicle based at least in part on second motion option 514

Identify vehicle in state to proceed to intended destination 520

Control vehicle based at least in part on reference trajectory 522

FIG. 5C

TELEOPERATION OF A VEHICLE

BACKGROUND

Autonomous and semi-autonomous vehicles typically use various techniques to navigate in real world-conditions. Sensors on the vehicle may be used to sense the surroundings of the vehicle as it navigates through an environment. Computational components may control the vehicle based on data from the sensors to safely traverse the environment. Despite continued improvement in the range of scenarios that autonomous vehicles can automatically navigate, there may still be rare or unexpected events in the environment that prevent the vehicle from continuing to its intended destination.

BRIEF DESCRIPTION OF DRAWINGS

The detailed description is described with reference to the accompanying figures. The use of the same reference numbers in different figures indicates similar or identical components or features.

FIGS. 5A-C illustrate a further process according to techniques of the present disclosure.

DETAILED DESCRIPTION

Figure 1:
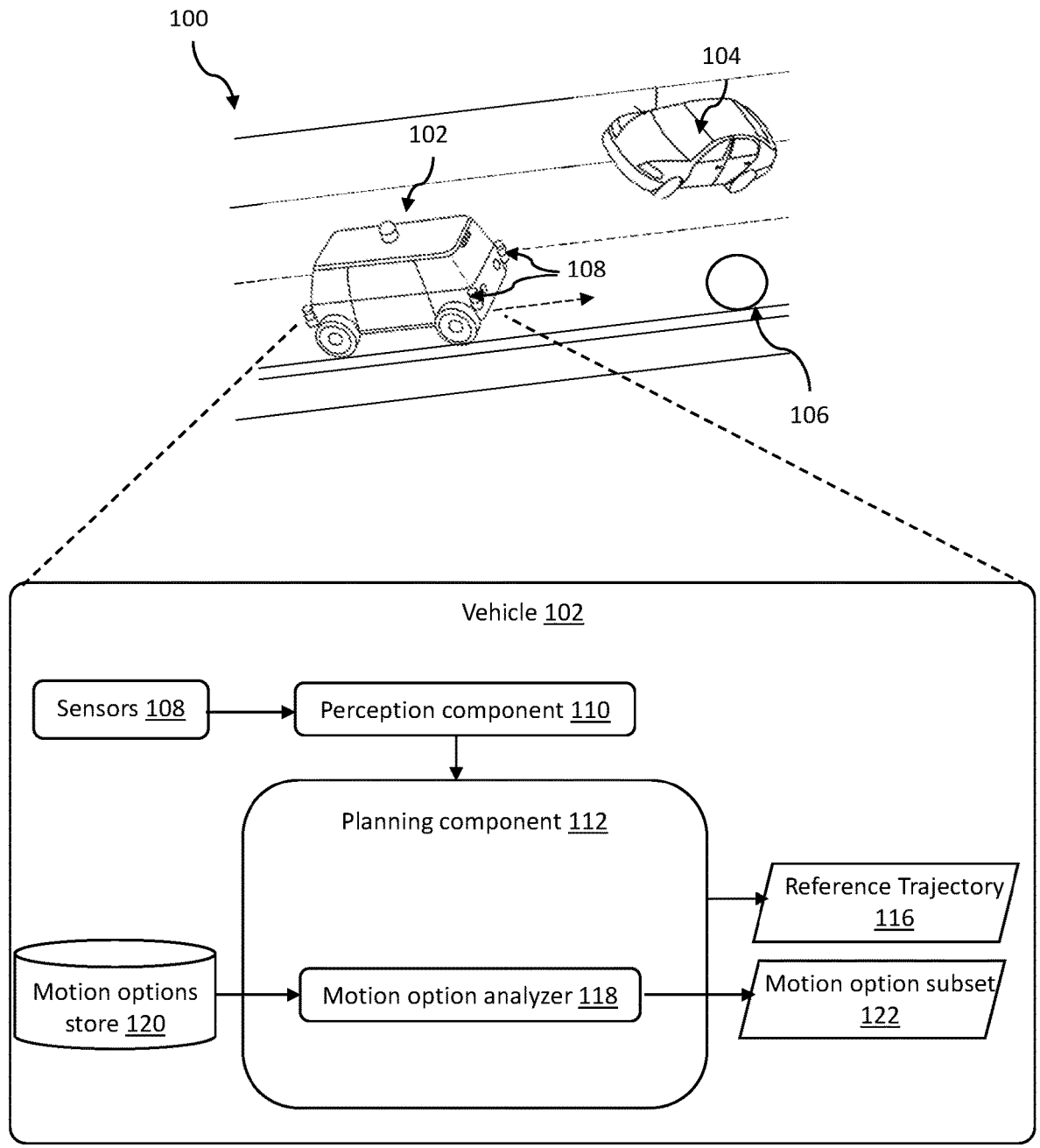
FIG. 1 is a schematic representation of computing systems of a vehicle.

The present disclosure relates to methods, apparatuses, and systems for implementing directed control of an autonomous vehicle, for example in situations where an aspect of the environment impedes the vehicle from autonomously continuing to its intended destination or otherwise when an event interferes with nominal operation of the vehicle. According to techniques of the present disclosure, the vehicle may determine a subset of motion options from a set of predetermined motion options associated with controlling the vehicle. In a non-limiting example, a motion option may direct the vehicle to move in a particular direction or to a particular position, at a particular speed, and/or for a particular distance. The predetermined set of motion options may provide a range of options for moving the vehicle which may be intended to be applicable to many environmental contexts. For example the predetermined motion options may have end states that are regularly spaced over one or more values such as position, heading, speed, etc. The predetermined motion options may be contrasted with the dynamically produced trajectories typically generated by planning components of an autonomous vehicle. The vehicle may select a suitable subset of the motion options which are applicable to the current environmental conditions surrounding the vehicle (e.g. objects around the vehicle, road layout, etc.). The vehicle may transmit the determined subset of motion options (and/or a representation thereof) to a remote system. In a non-limiting example, an operator at the remote system may review the subset of motion options in the context of the environment around the vehicle, and may select a first motion option of the motion options for controlling the vehicle. The vehicle may receive the first motion option from the remote system, and the vehicle may then be controlled in accordance with the first motion option. For example, the vehicle may be controlled to move in a particular direction, at a particular speed, and/or for a particular distance as encoded in the first motion option. In non-limiting examples, such techniques may be used to direct the vehicle to move a relatively small distance (e.g. a few meters), and/or at relatively slow speeds (e.g. 5 mph or less). The intent of such small movements may be to safely reposition the vehicle such that conditions preventing autonomous operation are removed or otherwise changed sufficiently to allow the vehicle to autonomously proceed to the intended destination. According to the techniques presented herein, it is the vehicle that decides which of the predetermined motion options are available in the current circumstances, not the remote operator. For example the vehicle may decide based on current constraints such as vehicle properties or features of the environment around the vehicle. In effect, the vehicle may act as the 'source of truth' for which motion options are available. In contrast to alternatives in which a remote operator generates a control path ab initio, the present techniques allow for more precise control of the vehicle, and for more complex movements, as the vehicle is precisely aware of the environment around itself, whereas the remote operator may not be. Accordingly, the present techniques may allow for safe and precise remotely-directed control of an autonomous vehicle in situations where the autonomous vehicle has become stuck or otherwise cannot proceed to its intended destination.

Typically, autonomous control of a vehicle may be provided by one or more planning components onboard the vehicle. The planning component may receive sensor data from sensors of the vehicle, and may generate a candidate or reference trajectory upon which control of the vehicle may be based (for example by downstream components which directly control physical aspects of the vehicle). The planner component may for example perform a search algorithm, such as a tree search, to search between different possible trajectories for the vehicle that have been generated by the planner. Examples of tree search algorithms for generating trajectories are disclosed in U.S. patent application Ser. No. 17/327,351, filed on May 21, 2021, which is incorporated herein by reference for all purposes in its entirety. Potential trajectories may be verified against one or more constraints, such as safety, comfort, progress, and rules of the road constraints to identify an optimum trajectory which is output as the reference trajectory for controlling the vehicle. In contrast to such reference trajectories, the motion options of the present disclosure may be pre-set instructions for how to control the vehicle. The vehicle (e.g. the planning component) may select one or more of these motion options to determine the subset of motion options, but may not alter the control instructions provided by each selected motion option.

In some examples, the subset of motion options may be determined concurrently with determining the reference trajectory. In other words, the vehicle (e.g. planning component) may determine both a reference trajectory and a subset of motion options. Respective reference trajectories and subsets of motion options may be determined periodically, for example for each data period of the vehicle control systems (e.g. based on each tick, or subsequent moment in time, of received sensor data). Generating both reference trajectory and subset of motion options for each tick may reduce computational complexity, as there may be no need to provide an additional computational component to identify that the vehicle has become stuck. In other examples, the subset of motion options may only be determined when the vehicle is in a mode associated with the vehicle being unable to proceed to its intended destination; or where occurrence of an event is determined, the event preventing nominal operation of the vehicle. Such a mode may be initiated by a remote system, or by a system of the vehicle itself which is configured to identify that the vehicle is unable to proceed. For example, such a system may identify that the vehicle has not moved for a predetermined period of time.

In examples where both the subset of motion options and the reference trajectory are generated concurrently, the reference trajectory may be transmitted to the remote system in addition to the subset of motion options. Such examples may allow the remote system or remote operator to view the trajectory the vehicle is trying to travel. In a non-limiting example, the remote system may determine whether a received reference trajectory will allow the vehicle to proceed to the intended destination. If so, the remote system may allow the vehicle to return to autonomous control, rather than directed control based on a motion options. Such techniques may minimize the time the vehicle is under directed control the remote operator, whilst maintaining remotely-directed control where necessary.

In some techniques of the present disclosure, indications or representations of the motion options of the subset of motion options may be transmitted to the remote system. As the motion options are predetermined, the remote system may store a copy of the full information defining the motion options. The remote system may retrieve the full motion options of the subset from its local store upon receipt of identifiers identifying the respective motion options. For example, each motion option may be associated with a respective identifier. The identifier of each motion option the determined subset of motion options may be transmitted to the remote system. In some examples, a binary identifier may be transmitted. In some examples, transmitting the subset of motion options may comprise transmitting a binary vector having a non-zero entry associated with the motion options of the subset of motion options. In a non-limiting example, transmitting the subset of motion options to the remote system may comprise transmitting a bitmask to the remote system. Each motion option may be associated with a respective position in the bit mask. Such techniques may reduce the amount of data needed to be transmitted to the remote system compared to sending a full reproduction of the motion options. For example, this may reduce latency of communications between the vehicle and the remote system, and hence the latency of receiving control instructions from the remote system. Correspondingly, in some examples the remote system may transmit an indication or representation of the selected first motion option to the vehicle.

In some examples, the predetermined motion options may be spaced (e.g. regularly spaced) from one another by a physical parameter associated with the vehicle. For example, motion options, or end states of motion options, may be regularly spaced by one or more of a position, a heading, a speed, an acceleration, or a steering rate. For example, the predetermined set of motion options may be associated with a range of regularly spaced vehicle headings (or vehicle heading bins). Each vehicle heading (or bin) may be associated with one or more motion options.

The predetermined motion options may in some examples define a full trajectory to achieve an end state, such as an end position. The trajectories of the motion options may be determined using a trajectory solver, which may for example determine paths based on starting state and end state constraints. The trajectories may be determined independently of any environment in which the vehicle is located, so that the trajectories may be pre-determined for use in any environment. The trajectory solver may use the same method as the planning component of the vehicle to determine trajectories, or may use other techniques.

In other examples, the predetermined motion options may specify only end states. In such cases the vehicle (e.g. a planning component of the vehicle) may determine a trajectory or trajectories to reach the defined end state(s). For example, the vehicle may determine a trajectory to reach an end state defined in the first motion option, when received from the remote system.

In some examples, determining the subset of motion options may comprise identifying motions having parameters, e.g. starting state parameters, associated with a current physical parameter of the vehicle (e.g. a current position, heading, speed, acceleration, and/or steering rate). For example, determining a subset of motion options may comprise identifying a physical parameter (e.g. position, heading, speed, acceleration and/or steering rate) in the predetermined set that matches a current physical parameter (e.g. current heading, steering angle(s), speed, acceleration, and/or steering rate) of the vehicle. The subset of motion options may then be determined from the one or more motion options associated with the identified physical parameter. Such examples may ensure that the determined motion options are physically valid given the current state of the vehicle. For example, such examples may ensure that the determined motion options start with a wheel position substantially matching the actual wheel positions of the vehicle at the current time. Furthermore, the predetermined motion options may be grouped into a plurality of bins based on one or more physical parameters associated with their starting state. For example, motion options of the predetermined set of motion options may be grouped based on an initial steering angle(s) defined by the motion options. One or more of the groups of motion options may be selected based on an identified current parameter of the vehicle, such as current steering angle. In such cases transmitting the subset of motion options may comprise transmitting an identifier representing the physical parameter (e.g. heading, steering angle(s), speed, acceleration, and/or steering rate), and optionally further identifiers indicating individual motion options within the group associated with the physical parameter. Such examples may further reduce the amount of data needed to transmit the subset of motion options to the remote system.

Some techniques of the present disclosure may comprise determining that one or more motion options of the subset of motion options satisfies a first safety condition, the first safety condition associated with a static object or static objects represented in the sensor data. For example, the vehicle may verify that a motion option will not result in an adverse safety event with a stationary object, such as a collision or near-miss. However, such techniques may omit verifying safety against moving objects at this stage. Checking safety against static objects may be computationally cheaper than checking safety against dynamic objects, and so such an approach may provide for greater computational efficiency. A full safety check against static and dynamic objects may be performed on the first motion option received from the remote system (e.g., by the vehicle computer), prior to controlling the vehicle in accordance with the first motion option. Thus the safety of vehicle maneuvers may be maintained in a computationally efficient manner. In non-limiting examples, the subset of motion options determined by the vehicle may comprise all motion options of the predetermined set of motion options which satisfy a safety condition (e.g. the first safety condition discussed above).

Typically, trajectories generated by the planning component of a vehicle may be evaluated against conditions (e.g. as evaluated costs) including safety, route progress, and driving laws. However, in some techniques of the present disclosure, the motion options of the subset of motion options, and/or the first motion option, may be checked against only safety criteria, but not other criteria such as driving laws. Such techniques may allow the remote operator more freedom to overcome the problem preventing the vehicle from progressing, whilst maintaining safety of the vehicle and its occupants.

In some examples, upon receipt of the first motion option, the planning component may identify a safety metric associated with the first motion option, for example based at least in part on static and dynamic objects as above. If the safety metric satisfies a safety condition (i.e. the maneuver is deemed safe), the vehicle may be controlled to proceed in accordance with the first motion option. For example the vehicle may be controlled as instructed by the first motion option, without any deviation. On the other hand, if the safety metric does not satisfy the safety condition (i.e. the maneuver is deemed unsafe or not safe enough), the vehicle may be controlled to stop. Thus when in a mode of operation associated with the motion options (e.g. the vehicle is unable to proceed autonomously to its intended destination), the vehicle may only stop or follow instructions of the first motion option.

Some techniques of the present disclosure may comprise transmitting map data to the remote system and/or a representation of location and orientation of the vehicle to the remote system such that the remote system may retrieve associated map data from a data store. Map data may be generated based at least in part on the sensor data recorded by the sensor(s) of the vehicle and/or previous vehicles. Typically in autonomous vehicle systems, map data may be fairly coarse, providing information covering relatively large distances around the vehicle without transmitting large amounts of data. In some techniques of the present disclosure, however, two types of map data may be transmitted. First map data and second map data may be transmitted to the remote system. First map data may have a higher resolution but cover a smaller area than second map data. First map data may be used by the remote system or operator when selecting the first motion option, providing precise information about objects close to the vehicle. Second map data may be used to monitor the environment at greater distances from the vehicle, for example for observing normal vehicle operation. Such examples may provide high resolution map data for motion option selection, whilst minimizing the amount of data transferred.

Some techniques of the present disclosure may comprise receiving, from a remote vehicle, a subset of motion options from a predetermined set of motions options associated with controlling the vehicle, the subset of motion options determined by the remote vehicle based at least in part on sensor data received by the remote vehicle from a sensor of the remote vehicle; receiving an operator input indicating a first motion option of the subset of motion options; and transmitting the first motion option to the remote vehicle for controlling the remote vehicle.

Some such techniques may comprise presenting a user interface comprising a user interface element representing an area associated with end locations of the subset of motion options. An operator input may be received on the user interface element indicating a target position in the area associated with the end positions of the subset of motion options. A motion option associated with the target position may be identified as the first motion option. For example, the motion option associated with the target position may be a motion option having an end position closest to the target position; or an interpolation between two or more motion options. Thus in such techniques, the remote operator may be presented with a general area from which they may select any desired position. The system may automatically identify the appropriate motion option based on this user input by selecting one of, or interpolating between, the subset of options (though such options are not directly presented to the user). In other examples, the user interface may provide individual user interface elements for each motion option of the subset of motion options. However, given that the techniques described herein may typically comprise only small movements, the end points of the motion options may be very close together and thus difficult for an operator to distinguish between on a user interface. Presenting a representative area may thus facilitate and guide user interaction, allowing a desired motion option to be more easily selected, and thus minimizing latency associated with controlling the vehicle.

The techniques discussed herein can improve a functioning of a computing device of a vehicle in a number of ways. For example, the techniques may provide for computationally efficient but precise control of the vehicle in situations where the vehicle is otherwise stuck. Techniques may provide a safe and efficient balance between computational processing onboard the vehicle and control by a remote operator. The techniques may also improve safety of the vehicle, allowing for safe, small, remotely-directed maneuvers in situations where the standard planning processes of the vehicle are unable to control the vehicle to proceed to the intended destination.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another examples, the techniques can be utilized in an aviation or nautical context, or in any system configure to input data to determine movement associated with objects in an environment. Further, although generally described as a remote operator selecting the first motion option, such selection may be made by a computer system. For example a remote computer system may comprise increased computational resources compared to the onboard systems, and so may be capable of identifying how to overcome situations causing the vehicle to become stuck. Further, although generally described in terms of a remote system/remote operator, some techniques may present the subset of motion options to an occupant of the vehicle, for example via an in-vehicle user interface. The occupant may then select the first motion option directly in the vehicle.

FIG. 1 illustrates an environment 100 in which a vehicle 102 is travelling along a road. In this example scenario, another vehicle 104 is parked on one side of the road, and a ball 106 lies in the roadway parallel with the parked vehicle 104. The ball 106 may generally represent any object that is not expected to be found in the road in normal driving circumstances.

The vehicle 102 may be an autonomous or semi-autonomous vehicle. In a normal mode of operation, vehicle 102 may control itself to travel through environment 100 to reach an intended destination, without human intervention. In particular, vehicle 102 may comprise one or more sensors 108. For example, sensors 108 may comprise a lidar sensor, a radar sensor, a visual imaging system, a GPS system, position/orientation sensors, and/or variations thereof. The sensors 108 may gather information about the environment 100, and objects in the environment 100, around the vehicle 102.

The vehicle 102 may also comprise a perception component 110. Perception component 110 may receive raw sensor data from the sensors 108. The perception component 110 may be configured to detect object(s) in the environment 100 surrounding the vehicle 102 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like, and may output perception data associated with the same.

The vehicle 102 may further comprise a planning component 112. The planning component 112 may receive sensor data (and/or output of components which act upon sensor data) providing information about the environment surrounding the vehicle 102. The sensor data may be received directly from one or more sensors 108, or may be received from the perception component 110. The planning component 112 may determine instructions for controlling operation of the vehicle 102 based at least in part on received sensor data. In particular, the planning component 112 may perform a search algorithm, such as a tree search, to organize and search through possible trajectories for controlling the vehicle. The planning component 112 may verify potential trajectories against various constraints. For example, the planning component 112 may verify a potential trajectory against one or more of: safety, comfort, route progress, and/or rules of the road. The planning component 112 may identify an optimum trajectory based on such constraints, and may output this trajectory as a reference trajectory 116 for controlling the vehicle and/or one or more alternate (e.g., contingent) trajectories. The reference trajectory 116 may then, in normal autonomous operation of the vehicle 102, be used to instruct downstream vehicle components to control the vehicle 102 in accordance with the reference trajectory 116. Further discussion of operation of a planning component 112 may be found for example in U.S. patent application Ser. No. 17/327,351, filed May 21, 2021, which is hereby incorporated in its entirety for all purposes.

In normal operation, the reference trajectory 116 generated by the planning component 112 may be sufficient to navigate the vehicle 102 autonomously through the environment 100. However, there may be rare circumstances in which the autonomous systems of vehicle 102 are not able to safely navigate through the environment 100 to its intended destination or are otherwise interfered with. This may happen for example where vehicle 102 encounters a rare driving scenario, such as an unusual arrangement of other vehicles in the environment 100, or presence of an unusual object in the road, etc. In some cases the vehicle 102 may become stuck because it may strictly follow the rules of the road, whereas a human driver may understand that a small deviation from the rules may be necessary to navigate a particular situation. Where vehicle 102 cannot process a safe route through the environment 100, the vehicle 102 may come to a halt and may be unable to proceed further. Of course, the techniques described herein need not be so limiting. As a non-limiting example, a planner component may provide an indication (e.g., a likelihood, confidence level, etc.) of the vehicle 102 becoming stuck at a future time and preemptively engage remote operations without coming to a full stop in anticipation. Further, the operations may be responsive to a passenger, for example, providing a request to pullover, etc.

In the example illustrated in FIG. 1, the parked vehicle 104 and ball 106 may restrict the available space on the roadway through which vehicle 102 can move. The available space may for example be narrower than a safety threshold applied by the planning component 112, and/or may for example require partially crossing into an opposing lane of traffic. As a result, vehicle 102 may not be able to process a route through the environment 100. It is noted that this simple scenario is presented for ease of illustration only, and that in practice vehicle 102 may be able to autonomously navigate such a scenario.

According to techniques of the present disclosure, the vehicle 102 may identify one or more motion options, from a predetermined set of motion options, that are applicable to the current environment 100 around the vehicle 102 and to the driving scenario causing the vehicle 102 to become stuck, or otherwise. The vehicle 102 may be aware of its surroundings via its sensors 108, and so may be best placed to determine which maneuvers are possible. A remote system or remote operator may then identify one motion option from the subset determined by the vehicle 102, and may transmit that motion option for controlling the vehicle 102.

As illustrated in FIG. 1, the planning component 112 may comprise a motion option analyzer 118. Although presented as part of the planning component 112, it is to be appreciated that motion option analyzer 118 may be located elsewhere on the vehicle 102's computing systems. Motion option analyzer 118 may receive sensor data from the sensors 108 and/or perception component 110. In addition, motion option analyzer 118 may be able to access motion option store 120. Motion option store 120 may store a set of predetermined motion options or motion primitives. Motion option store 120 may be a memory on the vehicle 102, or part thereof. Each motion option may define a maneuver for the vehicle to perform. For example, a motion option may specify that the vehicle moves a specified distance, moves at or below a specified speed, moves in a specified direction, and/or moves to a specified position to a desired end state (position, heading, speed, acceleration, etc.). As a non-limiting example, a motion option may instruct the vehicle to move 5 meters directly forwards at a speed of 5 mph such that when the vehicle reaches the intended point it is stopped and has a heading of 41 degrees. The predetermined set of motion options may be intended to provide a range of options for moving the vehicle 102 in the event that the vehicle 102 cannot autonomously progress to its intended destination (e.g., due to safety, uncertainty in the environment, passenger request, etc.). The predetermined set of motion options may be environment agnostic, and may be set and stored in motion option store 120 before the vehicle has begun its present journey. The predetermined set of motion options may be implemented on a plurality of vehicles, each comprising a respective motion options store. The predetermined set of motion options may be defined by a human operator, such as an engineer, or may be determined by a computer system, such as a remote system. The predetermined set of motion options may be transmitted wirelessly to vehicle 102 to be stored in motion options store 120, or otherwise delivered to vehicle 102. In some examples, the predetermined set of motion options may be updated occasionally, for example by over-the-air updates.

The motion option analyzer 118 may determine, based at least in part on the received sensor data, a subset 122 of the motion options stored in motion options store 120. The motion option analyzer 118 may identify those motion options which are applicable to the present environment 100 around the vehicle 102. For example, the motion option analyzer may identify those motion options which satisfy a safety condition. The safety condition may verify, for example, that if the vehicle 102 implemented a given motion option, the movement would not result in an adverse safety event such as a collision or the vehicle 102 coming within a threshold distance of another object.

In some examples, the motion option analyzer may determine the subset 122 based on static objects around the vehicle 102, but not based on dynamic objects (such as other moving vehicles). For example, the safety condition mentioned above may be verified only against static objects. Verifying safety of a motion option against only static objects may be computationally cheaper than verifying safety against all objects. The motion option analyzer 118 may check the safety of a large number of motion options. Checking safety of each one against static and dynamic objects may therefore require a larger amount of computational resources. Checking against only static objects, on the other hand, may be relatively computational efficient. Furthermore, the states of the dynamic objects may have changed in the time required to make the request and receive a response. As such, a full safety check against static and dynamic objects may be performed upon receipt of a selected motion option from a remote system, as described below.

The motion option analyzer 118 may review all motion options in the motion options store 120 based on the received sensor data. In other examples, however, the motion option analyzer 118 may restrict the available motion options based on a physical parameter of the vehicle. For example, the physical parameter may be a steering angle, a speed, a heading, an acceleration, and/or a steering rate. For example, the motion options in motion option store 120 may be separated based on the physical parameter. The motion option analyzer may first identify a physical parameter associated with the motion options that matches (e.g. is the same as, approximates, is the nearest value to, is a bin containing) the current value of the physical parameter of the vehicle 102, and then may compare the motion options of associated with the identified physical parameter to the sensor data. In this way, motion option analyzer may efficiently select motion options which are dynamically valid given the current state of the vehicle.

The motion option analyzer 118 may output the determined motion option subset 122 for transmission to a remote system. The remote system may be a teleoperations system. The remote system may be, or may be located at, a control center associated with a plurality of vehicles 102. An operator at the remote system may review the received motion option subset 122, and may identify one motion option of the subset 122 for controlling the vehicle 102, as discussed below.

In some examples, the motion option analyzer 118 may operate concurrently with the determination of the reference trajectory 116, i.e. concurrently with the normal operations of the planning component 112. Respective subsets 122 of motion options and reference trajectories 116 may be determined periodically, for example for each processing tick of the computing systems of the vehicle 102. Thus, vehicle 102 may not need to detect that it is stuck before the motion option analyzer 118 determines the motion option subset 122. Indeed, the planning component 112 may not realize that the vehicle 102 is stuck. Furthermore, ensuring the remote option subset 122 is constantly determined minimizes and/or reduces the amount of latency in engaging such a system in the event that it is activated. Determining the motion option subset 122 at all times therefore ensures the remote system receives the subset 122 even where the vehicle 102 itself thinks it is operating as normal. In some examples, motion options may only be included in the subset 122, and/or the motion option subset 122 may only be determined, and/or the motion option subset 122 may only be transmitted to the remote system if predetermined conditions are met. For example, a predetermined condition may be that the vehicle is travelling below a threshold speed. The threshold speed may be 10 mph or less, or 7 mph or less, or 5 mph or less. In still other examples, the vehicle 102 may determine that it is unable to progress to its intended destination, and may only determine/transmit the motion option subset 122 if such a determination is made. For example, the vehicle 102 may be determine that it is unable to progress if it has been stationary for longer than a predetermined period of time. Where both a reference trajectory 116 and motion option subset 122 are generated, both reference trajectory 116 and motion option subset 122 may be transmitted to the remote system. Of course, all other states are contemplated (e.g., motion options for vehicles travelling at highway speeds).

Figure 2:
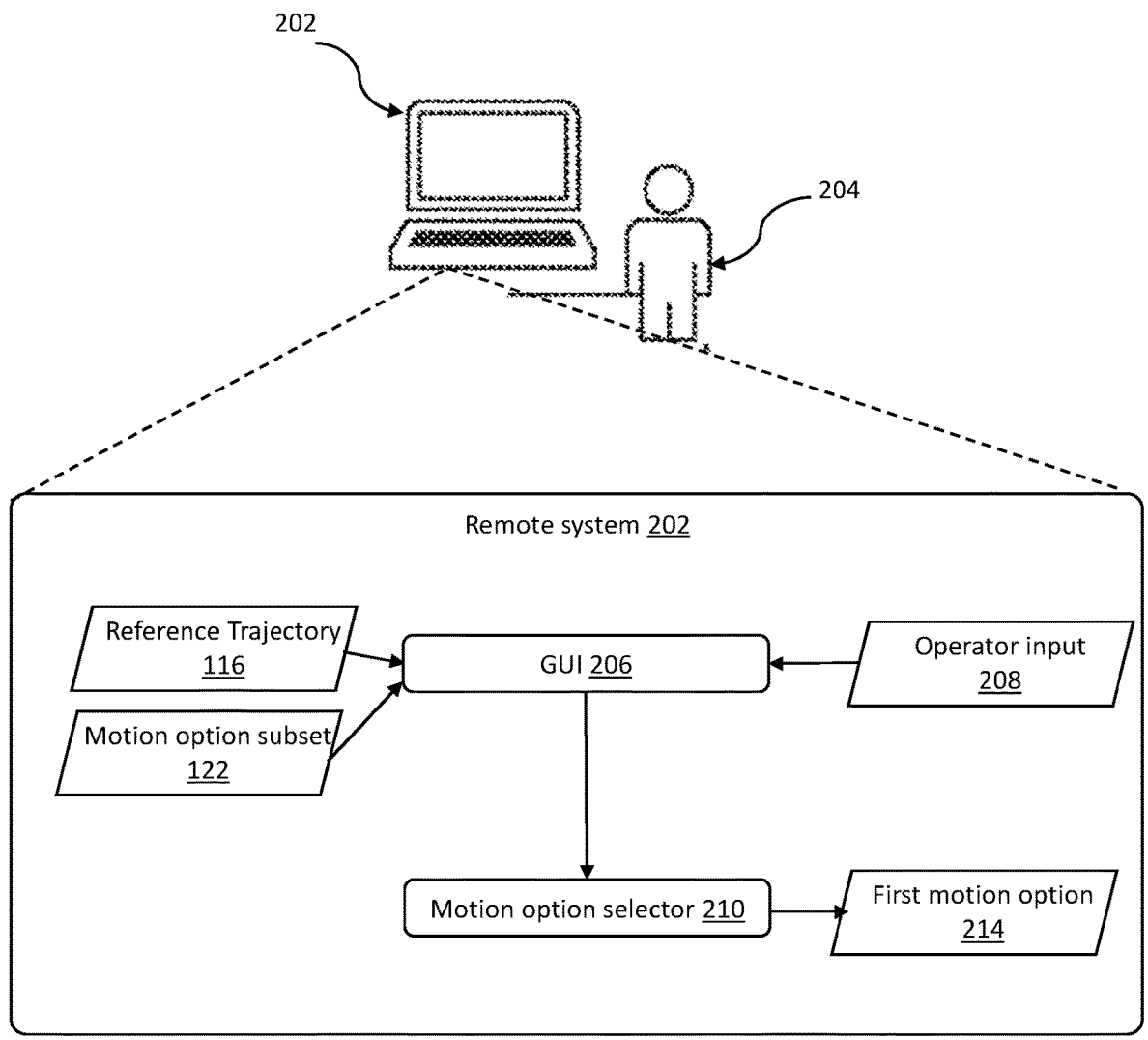
FIG. 2 is a schematic representation of a remote system.

FIG. 2 illustrates an example remote system 202. In this example the remote system 202 may be controlled by a (human) operator 204. In other examples, however, the operations described below may be performed entirely by computer systems. For example, remote system 202 may comprise one or more computer programs and/or machine learned models configured to select the first motion option as discussed below. Although described here as a remote system 202 and remote operator 204, it is noted that the remote system 202 and remote operator 204 may be co-located—i.e. the system 202 and operator 204 may be remote from the vehicle 102, but not from each other.

Remote system 202 may receive the motion option subset 122 and optionally reference trajectory 116 from the vehicle 102. The motion option subset 122 and/or reference trajectory 116 may be received directly (and wirelessly) from the vehicle 102, or may be received from an intermediary system such as from another system of a control center of which the remote system 202 is part.

In this example, remote system 202 may comprise a graphical user interface, GUI 206. The GUI 206 may for example be displayed on a screen for the operator 204 to view. The GUI 206 may be a user interface which allows the operator to interact with the remote system 202. The GUI 206 may allow the operator 204 to monitor operation of the vehicle 102 as it travels through the environment 100. For example, GUI 206 may visually depict the vehicle 102, map data present elements of the environment 100 in which the vehicle 102 is travelling (e.g. road layout), and/or objects around the vehicle 102 (e.g. as detected by sensors 108 on the vehicle 102).

Figure 3A:
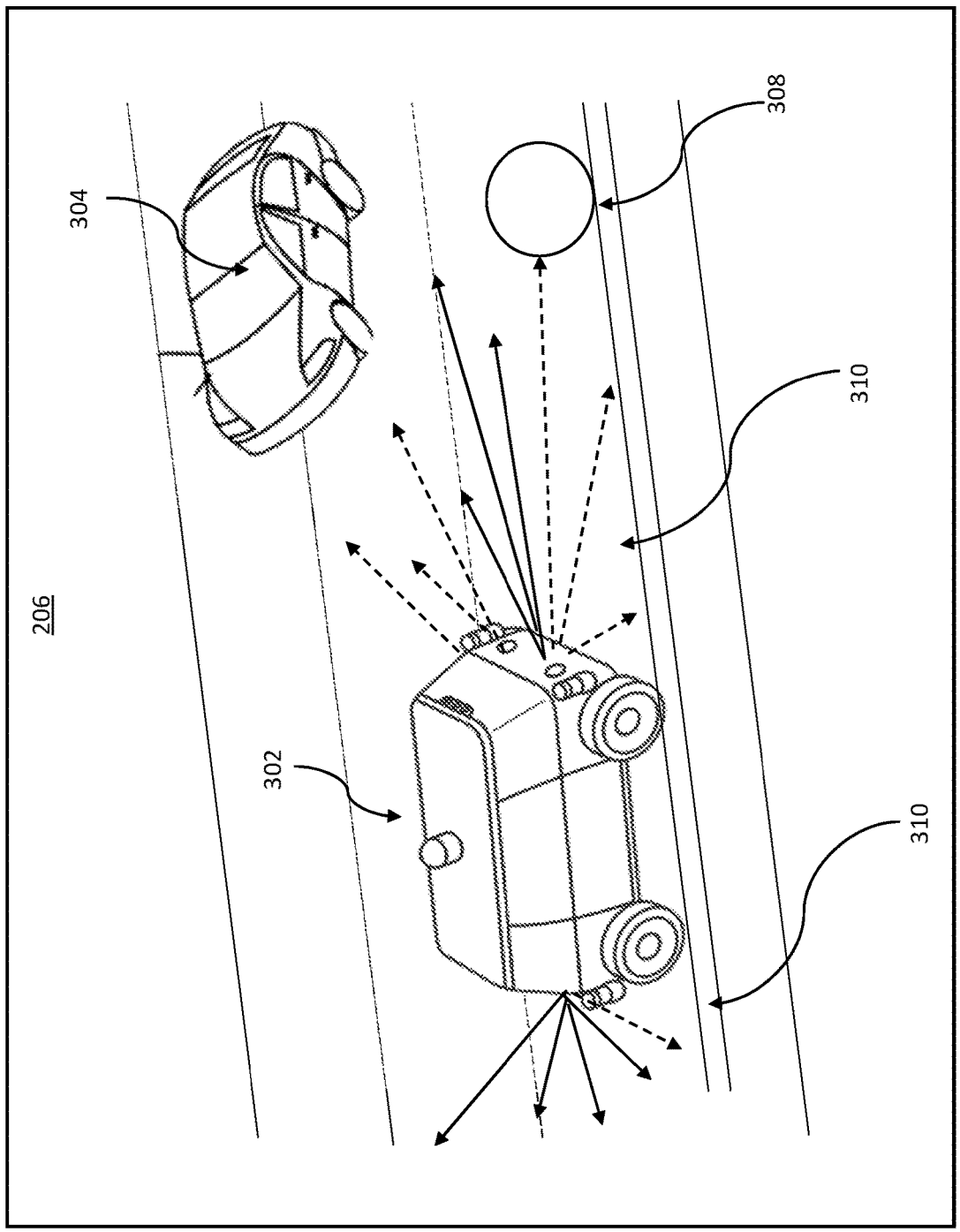
FIG. 3A illustrates an example of a GUI presented to an operator of the remote system.
Figure 3B:
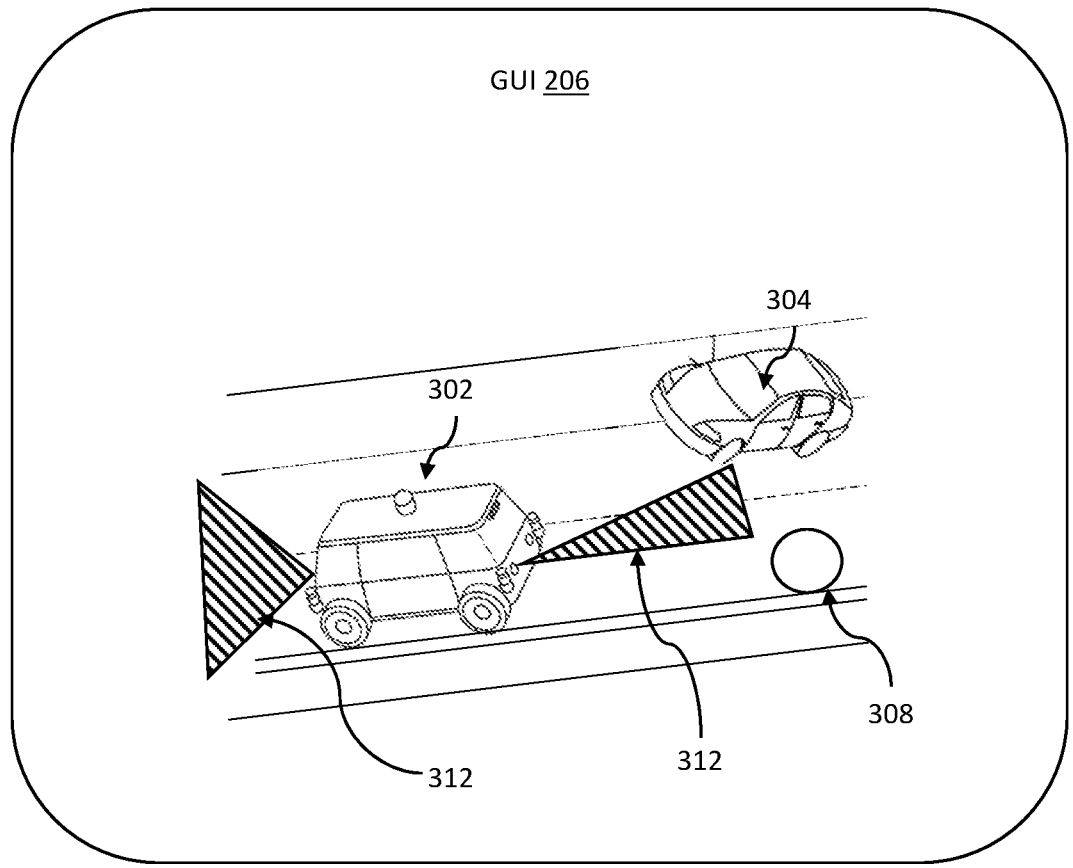
FIG. 3B illustrates another example of a GUI presented to an operator of the remote system.

FIGS. 3A and 3B illustrate example GUIs 206 visually depicting the environment 100 around the vehicle 102 in the example scenario of FIG. 1. In particular, the example GUIs 206 of both of FIGS. 3A and 3B comprise a representation 302 of the vehicle 102; a representation 304 of the parked vehicle 104; and a representation 308 of the ball 106.

The GUI 206 may also visually depict the motion options of the motion option subset 122. In some examples, the motion options may be represented by their respective end states (e.g. end positions), and/or by a trajectory the vehicle 102 would follow to reach that end state. The end state of a motion option may be the state the vehicle 102 would be in after completing the maneuver defined in the motion option. For example the end position (or end point) of a motion option may be the position the vehicle 102 would be at after competing the maneuver defined in the motion option. The position of the vehicle 102 may be defined with respect to the center of the vehicle 102, or the front of the vehicle 102, or any other position on the vehicle 102.

FIG. 3A illustrates a first example GUI 206. In this example the GUI 206 presents trajectories 310, i.e. paths, that vehicle 102 could take. The trajectories are represented in this example by the straight arrows emanating from the representation 302 of the vehicle 102. In this example, the GUI 206 presents trajectories representing all of the possible motion options in the predetermined set of motion options. The trajectories 310 represented by solid arrows represent the motion options of the motion option subset 122 received at the system remote 202 from the vehicle 102. These are the motion options that may be available to be selected by the operator 204. For example, the operator 204 may click, touch, or otherwise indicate an input on a solid-line trajectory 310 representing a desired motion option. The remaining trajectories 310, represented by broken arrows, represent the motion options of the full predetermined set of motion options that are not included in the motion option subset 122. As can be seen, such motion options may include those that would move the vehicle 102 towards or into the other vehicle 104, the ball 106, or off the roadway. The broken trajectories 310 may not be available to select by the operator 204. They may still be illustrated on the GUI 206, however, to provide more information to the operator 204. For example, they may visually demonstrate to the operator 204 why one or more motion options of the full predetermined set of motion options are not available, e.g. because they would move the vehicle 102 into an object. It is noted that the example shown in FIG. 3A illustrates only a small number of trajectories 310, and only straight trajectories, for ease of illustration. In practice the full set of predetermined motion options, and the motion option subset 122 may comprise more trajectories than are illustrated here, and/or more complicated trajectories than the straight paths shown in FIG. 3A. In additional, or alternate, examples, such trajectories (both solid and/or broken) may not be displayed to an end user but merely areas of the environment capable of being selected. In such an example, input from the user may be used to determine the closest trajectory (of the solid trajectories) and/or interpolate therebetween.

In other examples, the individual end position of motion option of the subset 122 may be represented in GUI 206. For example, dots or crosses or other indicia may be used to visualize each end point. However, the distance of each end point from the current vehicle position, and/or the distance between end points of different motion options, may typically be small. In such cases, it may be difficult for the operator 204 to distinguish between different motion options, and to select an individual motion option for controlling the vehicle.

In yet other examples, such as that of FIG. 3B, the end positions (or generally end states) of the motion options of the subset 122 may instead be represented in the GUI 206 by user interface elements 312 representing an area associated with end positions (or end states) of the motion option subset 122. The area may be the physical area in the environment 100 into which the vehicle 102 could move if following any one of the motion options of the motion option subset 122. In other words, the area collectively represents the end points (or states) of all (or multiple) of the motion options of the motion option subset 122. As illustrated in FIG. 3B, multiple user interface elements 312 may represent different portions of the area into which the vehicle 102 could move. In FIG. 3B, a first user interface 312 element represents end positions (or end states) in front of the vehicle 102, and a second user interface element 312 represents end positions (or end states) behind the vehicle. In other examples, user interface elements 312 may also represent areas lateral of the vehicle 102, for example where the vehicle 102 is capable of sideways movement. In the example of FIG. 3B, the area 312 in front of the vehicle 102 is narrower than that at the back, as the number of motion options with end points in front of the vehicle may be comparatively limited due to the presence of the parked vehicle 104 and the ball 106.

The remote operator 204 may select a target position within the user interface elements 312 representing the position to which the operator 204 would like the vehicle 102 to move (or generally representing the desired end state of the vehicle 102). For example, the operator 204 may select the target position by clicking, touching, or otherwise providing input on the user interface element 312 at the desired target position. A motion option selector 210 of the remote system 204 (as seen in FIG. 2) may then identify a motion option associated with the indicated target position, and output that motion option as a first motion option 214. For example, the motion option associated with the target position may be (a) a motion option having an end position closest to the target position; or (b) an interpolation between two or more motion options having end positions proximal to the location. Thus in such examples, the remote operator 204 does not have to precisely select an end position of one of the motion options (and, in some instances, aren't presented with the motion options). Instead, the remote operator 204 may select a desired target position, irrespective of whether that position matches an end point of a motion option. The remote system 202 may then identify the motion option best matching the remote operator 204's input. As such, techniques of the present disclosure may facilitate human-machine interactions by guiding the remote operator 204 as to the areas that can be selected, and by allowing the remote operator 204 to select an approximate position whilst still providing precise instructions for controlling the vehicle 102. In other examples, however, the GUI 206 may present individual end points of each motion option. The remote operator 204 may then provide input identifying an individual end point. The corresponding motion option may then be output as the first motion option 214. Any other mechanism may also be used to present the motion options of the subset 122 of motion options to the remote operator 204, and to receive an input indicating a selected motion option from the remote operator 204.

In some examples, the remote operator 204 may select the first motion option 214 with a single input. For example, selecting one of the motion options as discussed above may completely define an intended end state of the vehicle 102. In other examples, however, the remote system 202 may receive multiple inputs from the remote operator 204 in order to select the first motion option. For example, in a first stage the remote operator 204 may provide an input to select a desired end position of the vehicle 102. In a second stage the remote operator 204 may provide an input to select a desired end heading of the vehicle 102. The remote system 202 may then identify a motion option matching or most closely matching the desired end position and the desired end heading.

In some examples, the GUI 206 may present indicate an end state of the vehicle associated with one or more motion options prior to receiving an input from the remote operator. For example, the remote operator may indicate a potential target end position, such as by hovering a mouse or other input over a location in the GUI 206, but may not yet have provided input selecting that location as the target end position. The GUI 206 may indicate the end state of a motion option associated with the potential target end position. For example, the GUI 206 may present a representation of the vehicle 102 at the end position and with the end heading of the motion option associated with the potential target end position. Such examples may provide a visual means to facilitate the remote operator 204's selection of the first motion option.

In examples such as that illustrated in FIG. 2, the remote system 202 may also receive the reference trajectory 116 from the vehicle 102. A representation of the reference trajectory 116 may also be presented on the GUI 206. Thus the remote operator 204 may be able to visualize both the possible movements associated with the motion options, and the movement of the vehicle 102 if the vehicle 102 was allowed to continue autonomously, as indicated by the reference trajectory 116. This may allow the remote operator 204 to see when the planning component 112 generates a reference trajectory 116 that is suitable to control the vehicle 102 to continue to its intended destination (e.g., once the vehicle is able to regain autonomous control). The remote operator 204 may therefore be readily able to identify when the vehicle 102 is capable of autonomous control, which may minimize the time the vehicle 102 is controlled remotely.

The identified first motion option 214 may be transmitted to the vehicle 102. The vehicle 102 may then be controlled in accordance with the first motion option 214. For example, the vehicle may perform the maneuver instructed by the first motion option 214. In some examples, the vehicle 102 (e.g. planner 112 of vehicle 102) may first perform a safety check on the first motion option 214 before implementing control based on it. For example, the vehicle 102 may verify that the first motion option 214 verifies a safety condition based on static and dynamic objects around the vehicle in environment 100. For example, a safety metric associated with the first motion option may be determined and compared to a safety threshold. The safety metric may be a score representing safety of the maneuver defined by the first motion option in light of the environment 100 around the vehicle (e.g., including both static and dynamic objects). In some examples, the first motion option 214 may only be verified for safety, not for other factors such as route progress or rules of the road. If the safety condition is met, the vehicle 102 may implement the first motion option 214. After performing the maneuver defined by the first motion option 214, the vehicle may await receipt of a further motion option from the remote system 202 (e.g. including transmitting a new subset of motion options to the remote system 202). If the safety condition is not met, the vehicle 102 may be controlled to come to a halt.

Figure 4:
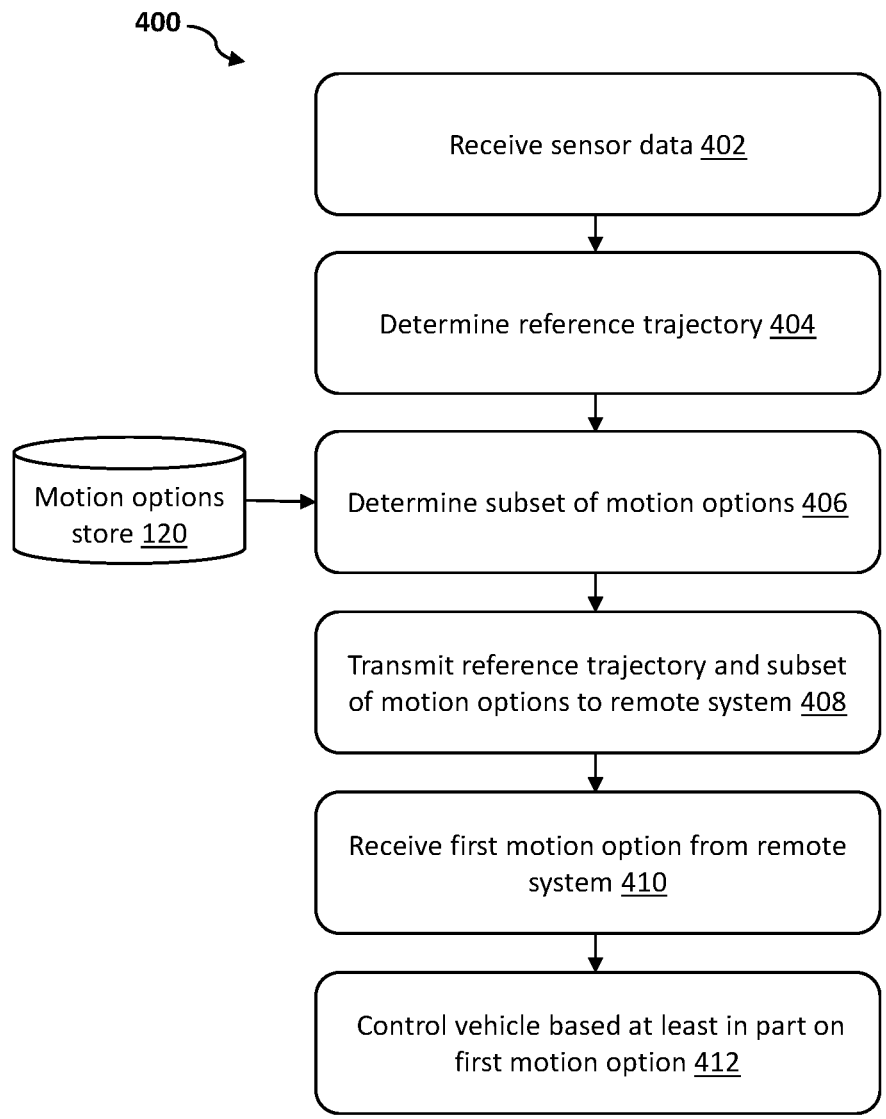
FIG. 4 illustrates a process according to techniques of the present disclosure.

FIG. 4 is a flow diagram representing an example computer-implemented process 400 according to the present disclosure. Process 400 may be performed by onboard systems of a vehicle, such as an autonomous vehicle. For example, process 400 may be performed by the planning component 112 of vehicle 102 discussed above. Process 400 may be implemented by a system comprising one or more processors and a memory storing instructions which, when executed by the one or more processors, cause the process 400 to be performed. Process 400 may be implemented on one or more computer-readable media storing instructions which, when executed by one or more processors, cause the process 400 to be performed. Process 400 may be implemented as a computer program comprising instructions which, when executed by a computer system, cause the process 400 to be performed.

Process 400 may comprise operation 402, at which sensor data may be received from a sensor associated with a vehicle. The vehicle may be the vehicle 102, and the sensor may be sensor 108, as discussed above.

Process 400 may comprise operation 404, at which, based at least in part on the sensor data, a reference trajectory for controlling the autonomous vehicle may be determined. The reference trajectory may be determined as discussed above in relation to reference trajectory 116.

Process 400 may comprise operation 406, at which, based at least in part on the sensor data, a subset of motion options from a predetermined set of motion options may be determined. Determining the subset of motion options may comprise the considerations discussed above in relation to motion option subset 122. The predetermined set of motion options may be associated with a vehicle state which prevents the autonomous vehicle from proceeding to the intended destination. The predetermined set of motion options may be stored in a motion options store 120, as discussed above.

In some examples, process 400 may comprise determining the occurrence of an event that prevents nominal operation of the autonomous vehicle. For example, it may be determined that the vehicle is not able to proceed to its intended destination. The predetermined motion options may be for overcoming the event. In some such examples, operation 406 of determining the subset of motion options may be performed only after determining occurrence of the event. In other examples, operation 406 may be performed whether or not occurrence of the event is determined. In some examples determining occurrence of the event may comprise actively detecting, by the vehicle, occurrence of the event. In other examples determining occurrence of the event may comprise receiving a signal from a remote system indicating the occurrence, and/or receiving a first motion option from the remote system. In other words, if a first motion option is received by the vehicle, the vehicle may determine occurrence of the event and/or determine that it is in a mode associated with teleoperation of the vehicle.

Process 400 may comprise operation 408, at which the subset of motion options may be transmitted to a remote system, such as remote system 202 discussed above. In some examples, the reference trajectory may also be transmitted to the remote system.

In some examples, transmitting the motion options to the remote system may comprise transmitting a plurality of indications associated with the subset of motion options, or a representation of the subset of motion options, to the remote system. For example, the indications may be a binary indication such as a bit mask. Such examples may reduce the amount of data that needs to be transmitted to the remote system. The subset of motion options may be transmitted via a wireless signal transmitter associated with the vehicle, such as a radio signal transmitter.

Process 400 may comprise operation 410, at which a first motion option of the subset of motion options may be received from the remote system. The first motion option may be received as an indication or representation of the first motion option, for example as an identifier representing the first motion option. The first motion option may be received via a wireless signal receiver associated with the vehicle, such as a radio signal receiver. In some examples the vehicle (or computer systems thereof) may periodically check to determine if a first motion option has been received. If it has, the vehicle may switch to a mode of operation associated with control based on motion options. The vehicle may remain in such a mode until it receives a signal from the remote system releasing the vehicle from motion option control.

Process 400 may comprise operation 412, at which the vehicle may be controlled based at least in part on the first motion option. Controlling the vehicle based at least in part on the first motion option may comprise performing a maneuver defined in the first motion option. As discussed above in relation to FIGS. 1 and 2, a safety check may be performed on the first motion option prior to controlling the vehicle based on the first motion option.

Process 400 may further comprise transmitting additional subsets of motion options to the remote system. For example respective subsets may be transmitted each processing cycle (tick) of the computing systems of the vehicle. Process 400 may further comprise receiving a second motion option from the remote system for controlling the vehicle after the maneuver defined by the first motion option has been completed. Process 400 may further comprise receiving a signal from the remote system instructing the vehicle to return to autonomous control.

Figure 5A:
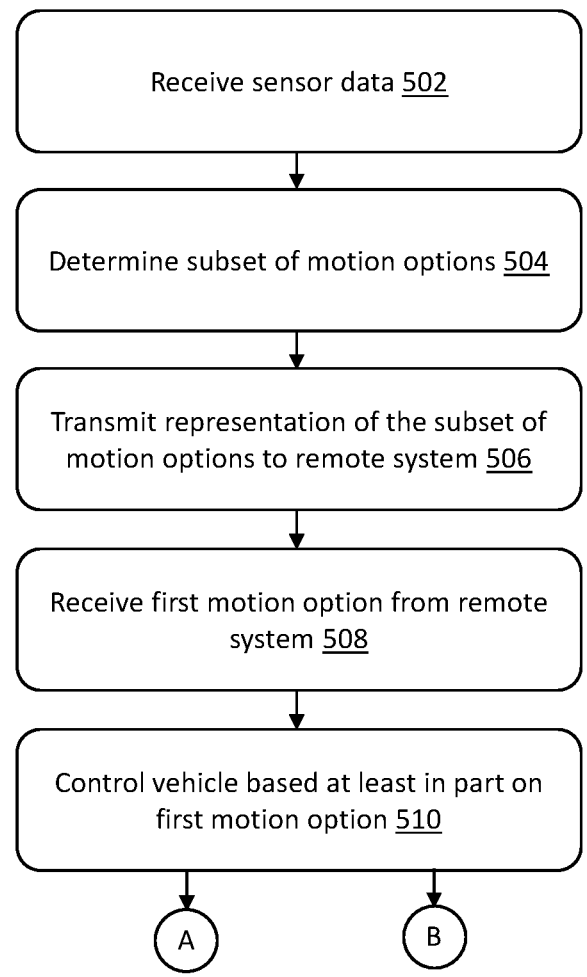

FIGS. 5A-5C are flow diagrams representing an example computer-implemented process 500 according to the present disclosure. Process 500 may be performed by onboard systems of a vehicle, such as an autonomous vehicle. For example, process 500 may be performed by the planning component 112 of vehicle 102 discussed above. Process 500 may be implemented by a system comprising one or more processors and a memory storing instructions which, when executed by the one or more processors, cause the process 500 to be performed. Process 500 may be implemented on one or more computer-readable media storing instructions which, when executed by one or more processors, cause the process 500 to be performed. Process 500 may be implemented as a computer program comprising instructions which, when executed by a computer system, cause the process 500 to be performed.

As shown in FIG. 5A, process 500 may comprise operation 502, at which sensor data from a sensor of a vehicle may be received. Operation 502 may be similar to operation 402 above.

Process 500 may comprise operation 504, at which based at least in part on the sensor data, a subset of motion options may be determined from a predetermined set of motions options associated with controlling the vehicle. Operation 504 may be similar to operation 406 above. In some examples, process 400 may comprise determining that the vehicle is unable to proceed along a route, for example a route to its intended destination. In such examples the subset of motion options may be determined based at least in part on the sensor data and on the inability to proceed.

In some examples, process 500 may comprise determining an indication for the vehicle to use an alternate planning framework, i.e. a planning framework different to the framework used in nominal vehicle operation (e.g. control based on reference trajectories determined by the planning component of the vehicle). The indication may for example be based at least in part on one or more of an event decreasing the safe operation of a vehicle (e.g. a potential adverse event), or a request from a passenger to pull over or otherwise stop the vehicle. The indication may be based at least in part on identifying that the vehicle has come to a halt, or has otherwise become stuck (e.g. has not moved for a predetermined period of time). The indication may be based at least in part on receiving a first motion option from a remote system, as described below. In other words, receiving the first motion option may be the trigger for the alternate planning framework without the vehicle itself having to first determine that it is unable to proceed safely to a destination.

Process 500 may comprise operation 506, at which a representation of the subset of motion options may be transmitted to a remote system, such as remote system 202. The representation of the subset of motion options may comprise a binary representation of the subset of motion options. For example, the representation may comprise a binary vector having a non-zero entry associated with a potential motion option to enable the vehicle to proceed. The binary vector may have non-zero entries associated with each motion option of the subset of motion options. The binary vector may have zero entries associated with motion options of the predetermined set of motion options that were not selected to be part of the subset of motion options. The representation may be a bitmask. As discussed above in relation to FIG. 1, the predetermined motion options may be separated based on a physical parameter, such as heading, speed, acceleration, and/or steering rate. In such examples, the representation may comprise an indication of the physical parameter, and may further comprise a binary vector representing motion options associated with that physical parameter. In other words, the physical parameter may be used to index or categorize the motion options. In other examples other representations of the subset of motion options may be transmitted. For example, locations of end positions associated with motion options of the subset of motion options may be transmitted to the remote system.

Process 500 may comprise operation 508, at which a first motion option of the subset of motion options may be received from the remote system. The first motion option may be received as a representation of the first motion option. Operation 508 may be similar to operator 410 discussed above.

Process 500 may comprise operation 510, at which the may be controlled vehicle based at least in part on the first motion option. Operation 510 may be similar to operation 412 discussed above.

FIG. 5B illustrates further optional operations 512, 514 of method 500, that may be performed in conjunction with operations 502-510. At operation 512, a second motion option may be received from the remote system. The second motion option may have been determined by the remote system from the subset of motion options transmitted in operation 506; or from a second subset of motion options transmitted by the vehicle. The second subset of motion options may be determined similarly to the subset of motion options in operation 506. For example, the second subset of motion options may be determined based on updated sensor data. The second subset of motion options may be determined and/or transmitted to the remote system whilst completing the maneuver defined by the first motion option, or after completing the maneuver defined by the first motion option. Having received the second motion option from the remote system, the vehicle may be controlled at operation 514 based at least in part on the second motion option. Any number of additional motion options may be received from the remote system, for example to direct control of the vehicle until the remote system instructs the vehicle to proceed autonomously. It is noted that one or more of operations 502-514 may be presented in a different order to that shown in FIGS. 5A and 5B. For example, the second motion option may be received in operation 512 before completion of operation 510 of controlling the vehicle based at least in part on the first motion option. In general, the vehicle may determine multiple subsets of motion before receiving a first motion option, or any subsequent selected motion options, from the remote system.

FIG. 5C illustrates further optional operations 520, 522 of method 500, that may be performed after operation 510 or after operation 514. At operation 520, it may be identified that the vehicle is in a state to proceed to its intended destination and/or to continue along a route. For example, it may be determined that the event causing the vehicle to become stuck has been avoided, passed, or otherwise overcome. The vehicle itself may identify it is in a state to proceed. In other examples, the a signal may be received from the remote system indicating that the vehicle is in a state to proceed, and/or instructing the vehicle to proceed autonomously. For example, such a signal may be transmitted to the vehicle when a remote operator, viewing a reference trajectory received from the vehicle, identifies that the reference trajectory allows the vehicle to continue autonomously.

At operation 522, the vehicle may be controlled based at least in part on a reference trajectory determined by the vehicle, for example determined by the planning component of the vehicle. In other words, the vehicle may return to autonomous control. The reference trajectory used for autonomous control may be determined based at least in part on sensor data received subsequent to determination of the subset of motion options. The reference trajectory may be a reference trajectory that has been transmitted to the remote system. The planning component may generate further reference trajectories to continue controlling the vehicle to its intended destination.

Figure 6:
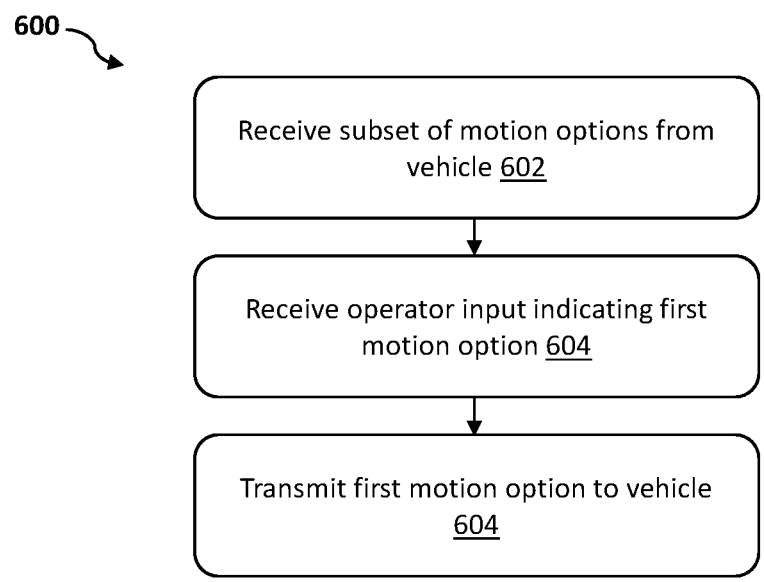
FIG. 6 illustrates a further process according to techniques of the present disclosure.

FIG. 6 is a flow diagram representing an example computer-implemented process 600 according to the present disclosure. Process 600 may be performed by a computing system, such as remote system 202 described above. The computing system may be associated with remote control of one or more vehicles. The computing system may be, or may be part of, a control center for controlling a plurality of vehicles. Process 600 may be implemented by a system comprising one or more processors and a memory storing instructions which, when executed by the one or more processors, cause the process 600 to be performed. Process 600 may be implemented on one or more computer-readable media storing instructions which, when executed by one or more processors, cause the process 600 to be performed. Process 600 may be implemented as a computer program comprising instructions which, when executed by a computer system, cause the process 600 to be performed.

Process 600 may comprise operation 602, at which a subset of motion options may be received from a vehicle. The subset of motion options may be from a predetermined set of motions options associated with controlling the vehicle. The subset of motion options may determined by the vehicle based at least in part on sensor data received by the vehicle from a sensor of or associated with the vehicle. The subset of motion options may be received from a vehicle performing process 400 or 500 discussed above.

In some examples, operation 602 may comprise receiving, from the vehicle, an indication or representation of the subset of motion options. For example, as discussed above, the subset of motion options may be represented by a binary vector or binary indications associated with the subset of motion options. In examples where an indication or representation of the subset of motion options is received, operation 602 may further comprise retrieving, from a memory storing the predetermined set of motion options, the subset of motion options based at least in part on the indication of the subset of motion options. Thus for example the system may comprise a motion options store mirroring motion option store 120. The motion option store may be, or may be part of, a memory associated with the system. Thus both the vehicle and the (remote) system may comprise a store of the same motion options, such that only an indication or representation (e.g. a reference number or bitmask), needs be transmitted from the vehicle to the system.

Process 600 may comprise operation 604, at which an operator input indicating a first motion option of the subset of motion options may be received. For example, an operator input may be received on a graphical user interface, as discussed above in relation to FIG. 2.

Process 600 may comprise operation 606, at which the first motion option may be transmitted to the vehicle for controlling the vehicle. In some examples, an indication or representation of the first motion option may be transmitted. The first motion option may be used by the vehicle as discussed above to control the vehicle.

Figure 7:
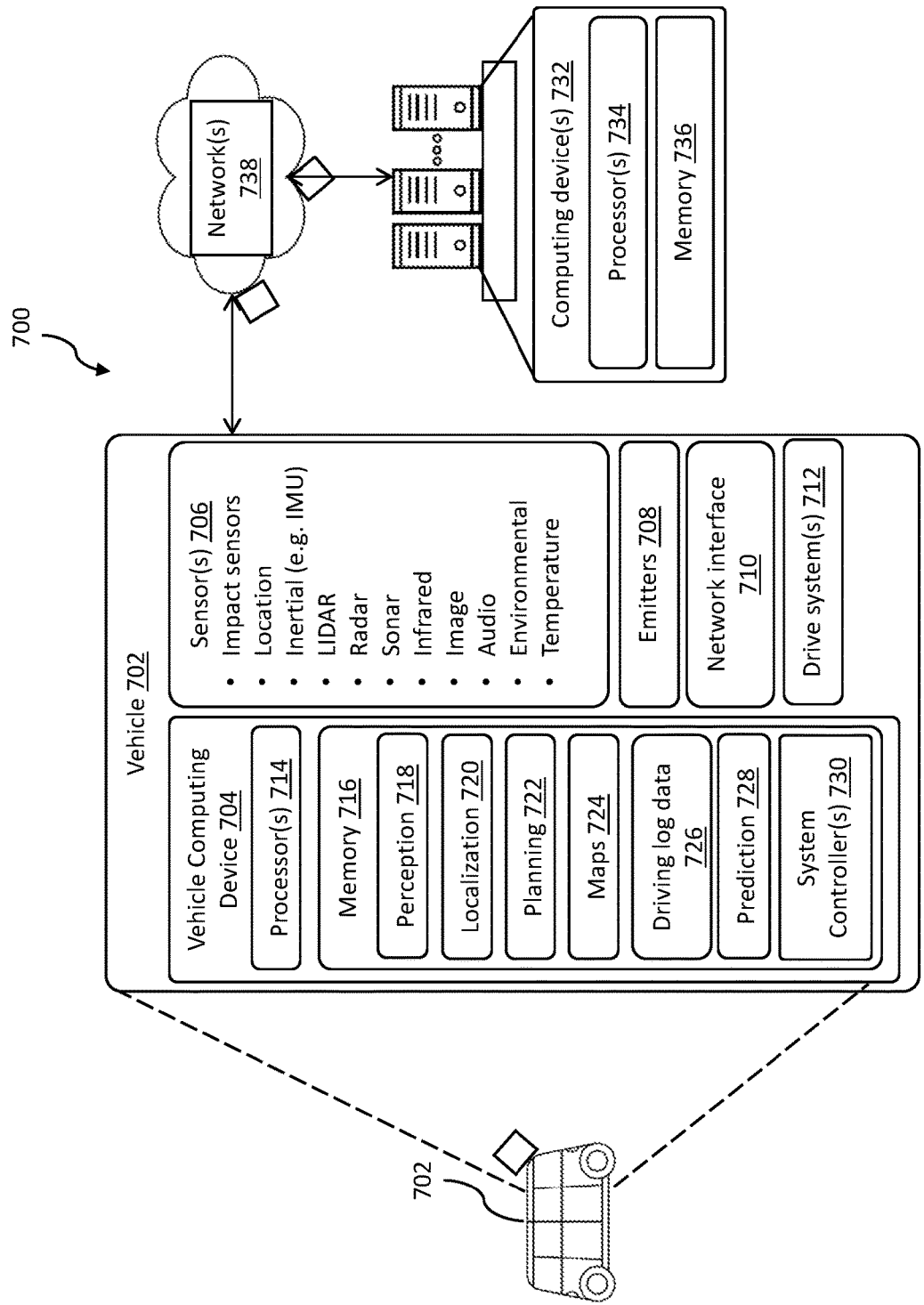
FIG. 7 schematically represents a vehicle and system which may be used to implement techniques of the present disclosure.

FIG. 7 illustrates a block diagram of an example system 700 that may implement the techniques discussed herein. In some instances, the example system 700 may include a vehicle 702. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well.

The vehicle 702 may include a vehicle computing device(s) 704, sensor(s) 706, emitter(s) 708, network interface(s) 710, and/or drive system(s) 712. Sensor(s) 706 may represent sensor(s) 108. The system 700 may additionally or alternatively comprise computing device(s) 732. Computing device(s) 732 may be, or may comprise, the remote system(s) described above.

In some instances, the sensor(s) 706 may represent sensor(s) 108 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 732.

The vehicle 702 may also include emitter(s) 708 for emitting light and/or sound, as described above. The emitter(s) 708 may include interior audio and visual emitter(s) to communicate with passengers of the vehicle 702. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s) (e.g. remote system 202). The network interface(s) 710 may facilitate communication with other local computing device(s) on the vehicle 702 and/or the drive component(s) 712. The network interface(s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 732 over a network 738. In some examples, computing device(s) 732 may comprise one or more nodes of a distributed computing system (e.g., a cloud computing architecture). The network interface(s) 710 may be used to transmit the subset of motion options to the remote system, and/or to receive the first motion option from the remote system, as discussed above.

The vehicle 702 may include one or more drive components 712. In some instances, the vehicle 702 may have a single drive component 712. In some instances, the drive component(s) 712 may include one or more sensors to detect conditions of the drive component(s) 712 and/or the surroundings of the vehicle 702. By way of example and not limitation, the sensor(s) of the drive component(s) 712 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 712. In some cases, the sensor(s) on the drive component(s) 712 may overlap or supplement corresponding systems of the vehicle 702 (e.g., sensor(s) 706).

The drive component(s) 712 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 712 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 712. Furthermore, the drive component(s) 712 may also include one or more communication connection(s) that enable communication by the respective drive component with one or more other local or remote computing device(s).

The vehicle computing device(s) 704 may include processor(s) 714 and memory 716 communicatively coupled with the one or more processors 714. Computing device(s) 732 may also include processor(s) 734, and/or memory 736. The processor(s) 714 and/or 734 may be any suitable processor capable of executing instructions to process data and perform operations as described herein. By way of example and not limitation, the processor(s) 714 and/or 734 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 716 and/or 736 may be examples of non-transitory computer-readable media. The memory 716 and/or 736 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 716 and/or memory 736 may store a perception component 718, localization component 720, planning component 722, map(s) 724, driving log data 726, prediction component 728, tracker component and/or system controller(s) 730—zero or more portions of any of which may be hardware, such as GPU(s), CPU(s), and/or other processing units.

The perception component 718 may detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 718 is referred to as perception data. The perception component 718 may be configured to associate a bounding region (or other indication) with an identified object. The perception component 718 may be configured to associate a confidence score associated with a classification of the identified object with an identified object. In some examples, objects, when rendered via a display, can be colored based on their perceived class. The object classifications determined by the perception component 718 may distinguish between different object types such as, for example, a passenger vehicle, a pedestrian, a bicyclist, motorist, a delivery truck, a semi-truck, traffic signage, and/or the like. Perception component 110 may be an example of perception component 718.

In at least one example, the localization component 720 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 720 may include and/or request/receive map(s) 724 of an environment and can continuously determine a location, velocity, and/or orientation of the autonomous vehicle 702 within the map(s) 724. In some instances, the localization component 720 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 720 may provide data to various components of the vehicle 702 to determine an initial position of an autonomous vehicle for generating a trajectory and/or for generating map data, as discussed herein. In some examples, localization component 720 may provide, to the perception component 718, a location and/or orientation of the vehicle 702 relative to the environment and/or sensor data associated therewith.

The planning component 722 may receive a location and/or orientation of the vehicle 702 from the localization component 720 and/or perception data from the perception component 718 and may determine instructions for controlling operation of the vehicle 702 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 730 and/or drive component(s) 712 may parse/cause to be carried out, second instructions for the emitter(s) 708 may be formatted according to a second format associated therewith). The instructions may be provided in the form of a trajectory to a tracker component. The trajectory may define an intended path for the vehicle 702 to follow. The tracker component may process the trajectory, and may generate a control signal for the system controller(s) 730 and/or drive component(s) 712 to control the vehicle. The planning component 112 may be an example of planning component 722.

The driving log data 726 may comprise sensor data, perception data, and/or scenario labels collected/determined by the vehicle 702 (e.g., by the perception component 718), as well as any other message generated and or sent by the vehicle 702 during operation including, but not limited to, control messages, error messages, etc. In some examples, the vehicle 702 may transmit the driving log data 726 to the computing device(s) 732. The computing device(s) 732 may identify one or more scenarios based at least in part on the log data, which may also comprise defining a scenario, wherein the scenarios are used to generate a playback simulation. For example, the computing device(s) 732 may determine an environmental layout, a number, type, and a configuration of object(s) in the environment and/or associate this definition with one or more portions of log data associated with that scenario. In some examples, the driving log data 726 may comprise (historical) perception data that was generated on the vehicle 702 during operation of the vehicle.

The prediction component 728 may generate one or more probability maps representing prediction probabilities of possible locations of one or more objects in an environment. For example, the prediction component 728 may generate one or more probability maps for vehicles, pedestrians, animals, and the like within a threshold distance from the vehicle 702. In some examples, the prediction component 728 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planning component 722 may be communicatively coupled to the prediction component 728 to generate predicted trajectories of objects in an environment. For example, the prediction component 728 may generate one or more predicted trajectories for objects within a threshold distance from the vehicle 702. In some examples, the prediction component 728 may measure a trace of an object and generate a trajectory for the object based on observed and predicted behavior. Although prediction component 728 is shown on a vehicle 702 in this example, the prediction component 728 may also be provided elsewhere, such as in a remote computing device as shown in FIG. 7. In some embodiments, a prediction component may be provided at both a vehicle and a remote computing device. These components may be configured to operate according to the same or a similar algorithm.

The memory 716 and/or 736 may additionally or alternatively store a mapping system, a planning system, a ride management system, etc. Although perception component 718 and/or planning component 722 are illustrated as being stored in memory 716, perception component 718 and/or planning component 722 may include processor-executable instructions, machine-learned model(s) (e.g., a neural network), and/or hardware.

As described herein, the localization component 720, the perception component 718, the planning component 722, the prediction component 728, and/or other components of the system 700 may comprise one or more ML (Machine Learning) models. For example, the localization component 720, the perception component 718, the planning component 722, and/or the prediction component 728 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 720 may additionally or alternatively store one or more system controller(s) 730, which may be configured to control steering, propulsion, braking, safety, emitters, communication, and other systems of the vehicle 702. These system controller(s) 730 may communicate with and/or control corresponding systems of the drive component(s) 712 and/or other components of the vehicle 702.

It should be noted that while FIG. 7 is illustrated as a distributed system, in alternative examples, components of the vehicle 702 may be associated with the computing device(s) 732 and/or components of the computing device(s) 732 may be associated with the vehicle 702. That is, the vehicle 702 may perform one or more of the functions associated with the computing device(s) 732, and vice versa.

EXAMPLE CLAUSES

A: A system comprising system comprising: one or more processors; and one or more non-transitory computer-readable media storing instructions that, when executed, cause the system to perform operations comprising: receiving sensor data from a sensor associated with an autonomous vehicle; determining, based at least in part on the sensor data, a reference trajectory for controlling the autonomous vehicle; determining the occurrence of an event that prevents nominal operation of the autonomous vehicle; determining, based at least in part on the sensor data, a subset of motion options from a predetermined set of motion options for overcoming the event; transmitting the reference trajectory and the subset of motion options to a remote system; receiving, from the remote system, a first motion option of the subset of motion options; and controlling the autonomous vehicle based at least in part on the first motion option.

B: The system of clause A, wherein the predetermined set of motion options are stored in a first memory associated with the autonomous vehicle and stored in a second memory associated with the remote system, and wherein transmitting the subset of motion options comprises transmitting a plurality of indications associated with the subset of motions.

C: The system of clause B, wherein the indications of the motion options of the subset of motion options are binary indications of the motion options of the subset of motion options.

D: The system of any of clauses A to C, the operations further comprising: determining that a motion option of the subset of motion options satisfies a first safety condition associated with a static object represented in the sensor data; and determining, based at least in part on the first motion option, that the first motion option satisfies a second safety condition, the second safety condition associated with a dynamic object represented in the sensor data.

E: A method comprising: receiving sensor data from a sensor of a vehicle; determining an indication for the vehicle to use an alternate planning framework; determining, based at least in part on the sensor data and the indication, a subset of motion options from a predetermined set of motions options associated with controlling the vehicle; transmitting a representation of the subset of motion options to a remote system; receiving, from the remote system, a first motion option of the subset of motion options; and controlling the vehicle based at least in part on the first motion option.

F: The method of clause E, wherein determining the indication is based at least in part on one or more of: an event decreasing the safe operation of a vehicle, or a request from a passenger to pull over.

G: The method of clause E or clause F, further comprising determining, based at least in part on the sensor data, a first reference trajectory associated with controlling the vehicle.

H: The method of clause G, comprising: identifying that the vehicle is in a state able to proceed to an intended destination; and controlling the vehicle based at least in part on a second reference trajectory.

I: The method of any of clauses E to H, comprising: identifying a safety metric associated with the first motion option; and controlling the vehicle, based at least in part on the safety metric, to proceed in accordance with the first motion option or to stop.

J: The method of any of clauses E to I, wherein the representation comprises a binary vector having a non-zero entry associated with a potential motion option to enable the vehicle to proceed.

K: The method of any of clauses E to J, wherein the predetermined set of motion options comprises a set of motions regularly spaced from one another by one or more of a position, a heading, a speed, accelerations, or a steering rate.

L: The method of any of clauses E to K, comprising determining the subset of motion options from the predetermined set of motion options based at least in part on a current physical parameter of the vehicle.

M: The method of any of clauses E to L, wherein the physical parameter is a steering angle.

N: One or more non-transitory computer-readable media storing instructions executable by one or more processors, wherein the instructions, when executed, cause the one or more processors to perform operations comprising: receiving, from a vehicle, a subset of motion options from a predetermined set of motions options associated with controlling the vehicle, the subset of motion options determined by the vehicle based at least in part on sensor data received by the vehicle from a sensor of the vehicle; receiving an operator input indicating a first motion option of the subset of motion options; and transmitting the first motion option to the remote vehicle for controlling the remote vehicle.

O: The one or more non-transitory computer-readable media of clause N, the operations comprising: presenting a user interface comprising a user interface element representing an area associated with end states of the subset of motion options.

P: The one or more non-transitory computer-readable media of clause N or clause O, the operations comprising: receiving an operator input on the user interface element indicating a target position in the area associated with the end states of the subset of motion options; identifying a motion option associated with the target position as the first motion option.

Q: The one or more non-transitory computer-readable media of any of clauses N to P, wherein the motion option associated with the target position is: (a) a motion option having an end position closest to the target position, or (b) an interpolation between two or more motion options having end positions proximal to the location.

R: The one or more non-transitory computer-readable media of any of clauses N to Q, the operations comprising: receiving, from the vehicle, an indication of the subset of motion options; and retrieving, from a memory storing the predetermined set of motion options, the subset of motion options based at least in part on the indication of the subset of motion options.

S: The one or more non-transitory computer-readable media of any of clauses N to R, the operations comprising transmitting, to the vehicle, an indication of the first motion option.

T: The one or more non-transitory computer-readable media of any of clauses N to S, the operations comprising: transmitting, to the vehicle, an indication that the vehicle is in a state to proceed to an intended destination.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing instructions that, when executed, cause the system to perform operations comprising:
   receiving sensor data from a sensor associated with an autonomous vehicle;
   determining, based at least in part on the sensor data, a reference trajectory for controlling the autonomous vehicle;
   determining an occurrence of an event that prevents nominal operation of the autonomous vehicle;
   determining, based at least in part on the sensor data, a subset of motion options from a predetermined set of motion options for overcoming the event, the predetermined set of motion options determined independently of a current state of the autonomous vehicle;
   transmitting the reference trajectory and the subset of motion options to a remote system;
   receiving, from the remote system, a first motion option of the subset of motion options; and
   controlling the autonomous vehicle based at least in part on the first motion option.

2. The system of claim 1, wherein the predetermined set of motion options are stored in a first memory associated with the autonomous vehicle and stored in a second memory associated with the remote system, and
   wherein transmitting the subset of motion options comprises transmitting a plurality of indications associated with the subset of motion options.

3. The system of claim 2, wherein the indications of the motion options of the subset of motion options are binary indications of the motion options of the subset of motion options.

4. The system of claim 1, the operations further comprising:
   determining that a motion option of the subset of motion options satisfies a first safety condition associated with a static object represented in the sensor data; and
   determining, based at least in part on the first motion option, that the first motion option satisfies a second safety condition, the second safety condition associated with a dynamic object represented in the sensor data.

5. A method comprising:
   receiving sensor data from a sensor of a vehicle;
   determining an indication for the vehicle to use an alternate planning framework;
   determining, based at least in part on the sensor data and the indication, a subset of motion options from a predetermined set of motion options associated with controlling the vehicle, the predetermined set of motion options independent of a current state of the vehicle;
   transmitting a representation of the subset of motion options to a remote system;
   receiving, from the remote system, a first motion option of the subset of motion options; and
   controlling the vehicle based at least in part on the first motion option.

6. The method of claim 5, wherein determining the indication is based at least in part on one or more of:
   an event decreasing safe operation of the vehicle, or
   a request from a passenger to pull over.

7. The method of claim 5, further comprising determining, based at least in part on the sensor data, a first reference trajectory associated with controlling the vehicle.

8. The method of claim 7, comprising:
   identifying that the vehicle is in a state able to proceed to an intended destination; and
   controlling the vehicle based at least in part on a second reference trajectory.

9. The method of claim 5, comprising:
   identifying a safety metric associated with the first motion option; and
   controlling the vehicle, based at least in part on the safety metric, to proceed in accordance with the first motion option or to stop.

10. The method of claim 5, wherein the representation comprises a binary vector having a non-zero entry associated with a potential motion option to enable the vehicle to proceed.

11. The method of claim 5, wherein the predetermined set of motion options comprises a set of motions regularly spaced from one another by one or more of a position, a heading, a speed, accelerations, or a steering rate.

12. The method of claim 5, comprising determining the subset of motion options from the predetermined set of motion options based at least in part on a current physical parameter of the vehicle.

13. The method of claim 12, wherein the physical parameter is a steering angle.

14. One or more non-transitory computer-readable media storing instructions executable by one or more processors, wherein the instructions, when executed, cause the one or more processors to perform operations comprising:
   receiving, from a vehicle, a subset of motion options from a predetermined set of motion options associated with controlling the vehicle, the predetermined set of motion options independent of a current state of the vehicle, the subset of motion options determined by the vehicle based at least in part on sensor data received by the vehicle from a sensor of the vehicle;

receiving an operator input indicating a first motion option of the subset of motion options; and transmitting the first motion option to the vehicle for controlling the vehicle.

15. The one or more non-transitory computer-readable media of claim 14, the operations comprising:

presenting a user interface comprising a user interface element representing an area associated with end states of the subset of motion options.

16. The one or more non-transitory computer-readable media of claim 15, the operations comprising:

receiving an operator input on the user interface element indicating a target position in the area associated with the end states of the subset of motion options;

identifying a motion option associated with the target position as the first motion option.

17. The one or more non-transitory computer-readable media of claim 16, wherein the motion option associated with the target position is:

(a) a motion option having an end position closest to the target position, or (b) an interpolation between two or more motion options having end positions proximal to the target position.

18. The one or more non-transitory computer-readable media of claim 14, the operations comprising:

receiving, from the vehicle, an indication of the subset of motion options; and retrieving, from a memory storing the predetermined set of motion options, the subset of motion options based at least in part on the indication of the subset of motion options.

19. The one or more non-transitory computer-readable media of claim 14, the operations comprising transmitting, to the vehicle, an indication of the first motion option.

20. The one or more non-transitory computer-readable media of claim 14, the operations comprising:

transmitting, to the vehicle, an indication that the vehicle is in a state to proceed to an intended destination.

\* \* \* \* \*